(12) United States Patent
Yoder

(10) Patent No.: US 12,270,365 B1
(45) Date of Patent: Apr. 8, 2025

(54) SMALL ENGINE STARTER DEVICE

(71) Applicant: John Yoder, Libby, MT (US)

(72) Inventor: John Yoder, Libby, MT (US)

(*) Notice: Subject to any disclaimer, the term of this patent is extended or adjusted under 35 U.S.C. 154(b) by 0 days.

(21) Appl. No.: 18/797,151

(22) Filed: Aug. 7, 2024

(51) Int. Cl.
*F02N 11/08* (2006.01)

(52) U.S. Cl.
CPC ...... *F02N 11/0851* (2013.01); *F02N 11/0803* (2013.01)

(58) Field of Classification Search
CPC .................. F02N 11/0851; F02N 11/0803
See application file for complete search history.

(56) References Cited

U.S. PATENT DOCUMENTS

| | | |
|---|---|---|
| 6,915,773 B2 | 7/2005 | Smith |
| D633,444 S | 3/2011 | Chau |
| 8,490,592 B1 | 7/2013 | Von Tiergen |
| 9,624,891 B2 | 4/2017 | Koenen |
| 10,087,905 B2 | 10/2018 | Budden |
| 2003/0079558 A1 | 5/2003 | Muehlbauer |
| 2011/0126790 A1 | 6/2011 | Vacek |
| 2015/0240773 A1* | 8/2015 | Koenen .................... F02N 11/12 290/38 R |
| 2016/0115933 A1* | 4/2016 | Koenen .................. H01M 10/02 290/38 R |
| 2019/0118403 A1 | 4/2019 | Kartman |

FOREIGN PATENT DOCUMENTS

WO 2013158397 10/2013

* cited by examiner

*Primary Examiner* — Xiao En Mo

(57) ABSTRACT

A small engine starter device for automatically starting a small engine includes a flywheel gear which is attachable to a flywheel of a small engine in place of a pull start mechanism that has been removed from the flywheel. A starter is mountable to the small engine such that the starter surrounds the flywheel gear. The starter is actuatable into a starting condition such that the starter engages the flywheel gear. Additionally, the starter rotates the flywheel gear when the starter is actuated into the starting condition thereby enabling the starter to start the small engine. The starter has a battery socket for receiving a battery of a cordless power tool thereby enabling the starter to be powered by the battery of the cordless power tool.

7 Claims, 7 Drawing Sheets

SMALL ENGINE STARTER DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to starter devices and more particularly pertains to a new starter device for automatically starting a small engine. The device includes a flywheel gear that is attachable to a flywheel of a small engine in place of a pull start mechanism of the small engine. The device includes a starter that is mountable to the small engine and the starter includes a battery socket for receiving a battery of a cordless power tool. The starter engages the flywheel gear when the starter is actuated for starting the small engine in lieu of the pull start mechanism.

(2) Description of Related Art Including Information Disclosed Under 37 CFR 1.97 and 1.98

The prior art relates to starter devices including a lawn mower starter device that includes a starter motor that is in mechanical communication with a pull rope of a pull start mechanism of the lawn mower for automatically starting the lawn mower and a torque transfer starter device for a small engine that includes a starter that is removably attachable to a hand held power tool for automatically starting the hand held power tool and a starter battery pack device that is attachable to outdoor power equipment for supplying electrical power to a starting circuit of the outdoor power equipment a starter device that is attachable to a two-stroke engine for starting the two-stroke engine. In no instance does the prior art disclose a small engine starting device that includes a flywheel gear that is mountable to a small engine in place of a pull start mechanism that has been removed from the small engine and a starter that is attachable to the small engine which includes a battery socket for receiving a battery of a cordless power tool.

Brief Summary of the Invention

An embodiment of the disclosure meets the needs presented above by generally comprising a flywheel gear which is attachable to a flywheel of a small engine in place of a pull start mechanism that has been removed from the flywheel. A starter is mountable to the small engine such that the starter surrounds the flywheel gear. The starter is actuatable into a starting condition such that the starter engages the flywheel gear. Additionally, the starter rotates the flywheel gear when the starter is actuated into the starting condition thereby enabling the starter to start the small engine. The starter has a battery socket for receiving a battery of a cordless power tool thereby enabling the starter to be powered by the battery of the cordless power tool.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
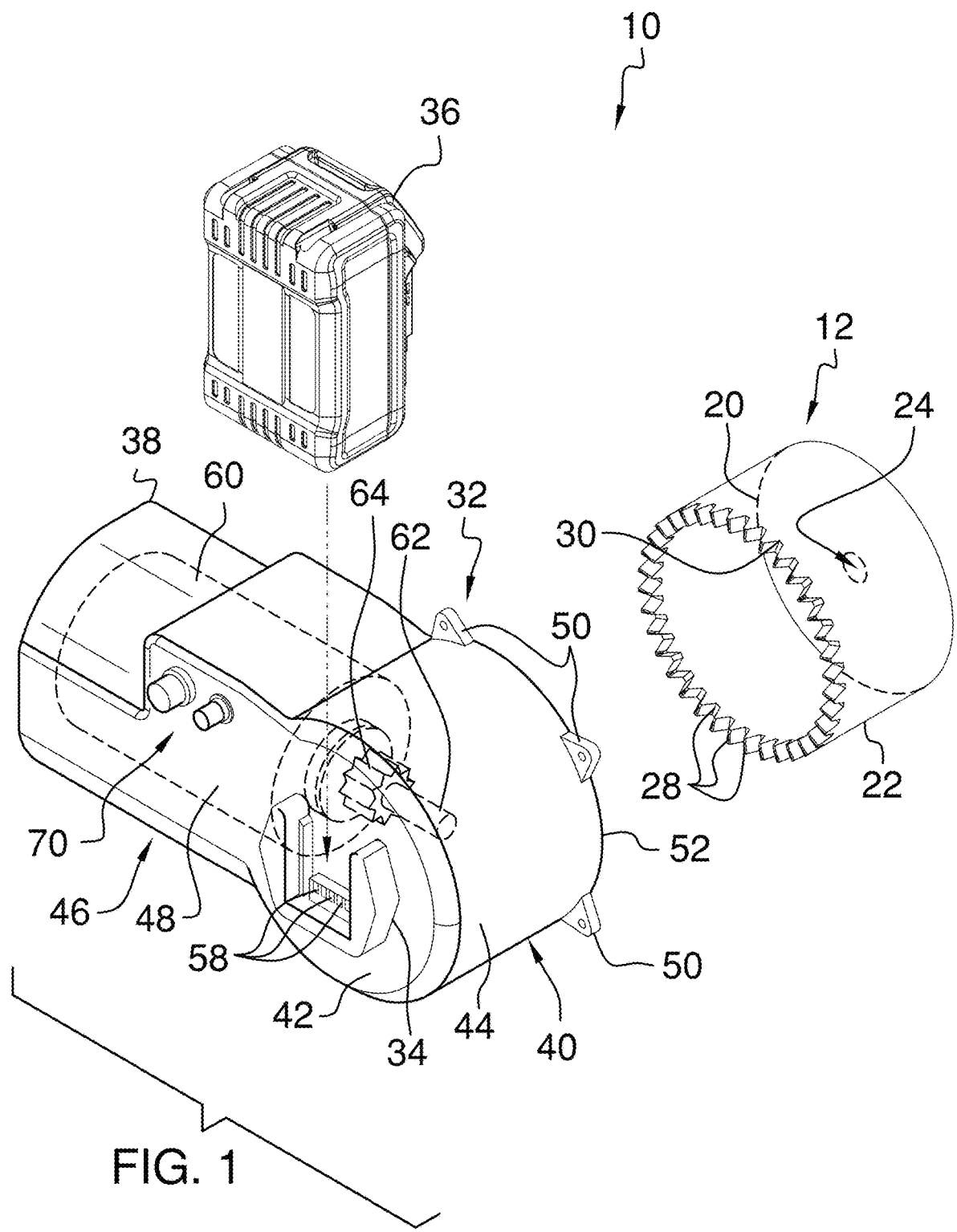
FIG. 1 is an exploded perspective view of a small engine starter device according to an embodiment of the disclosure.
Figure 2:
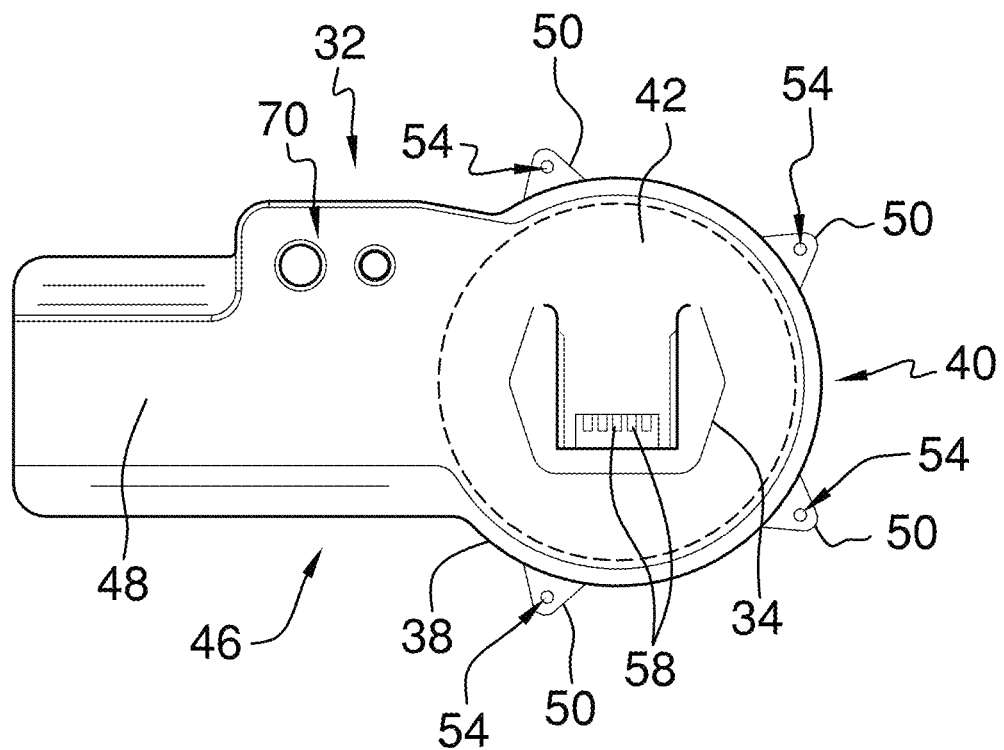
FIG. 2 is a top view of a starter of an embodiment of the disclosure.
Figure 3:
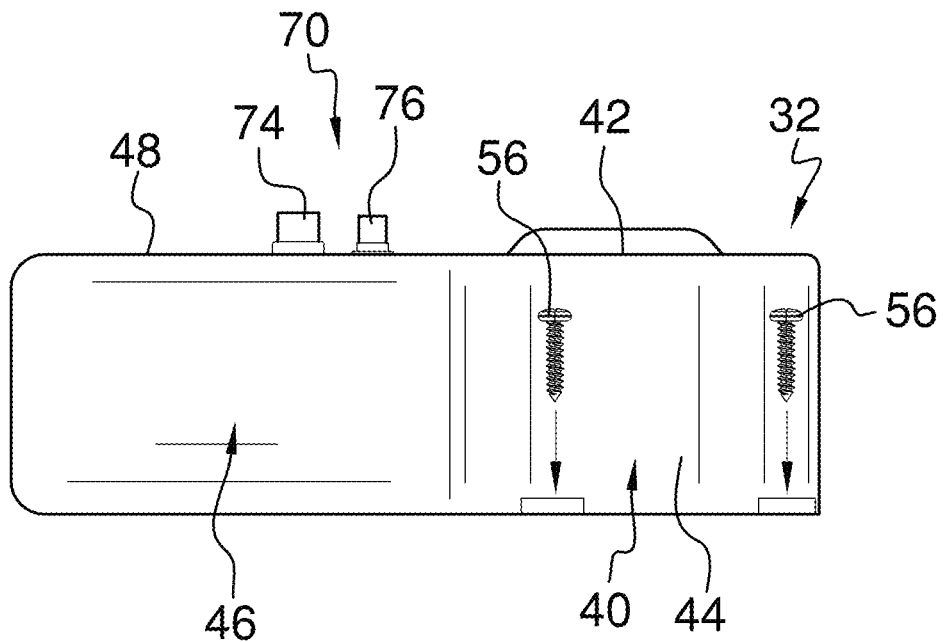
FIG. 3 is a right side view of a starter of an embodiment of the disclosure.
Figure 4:
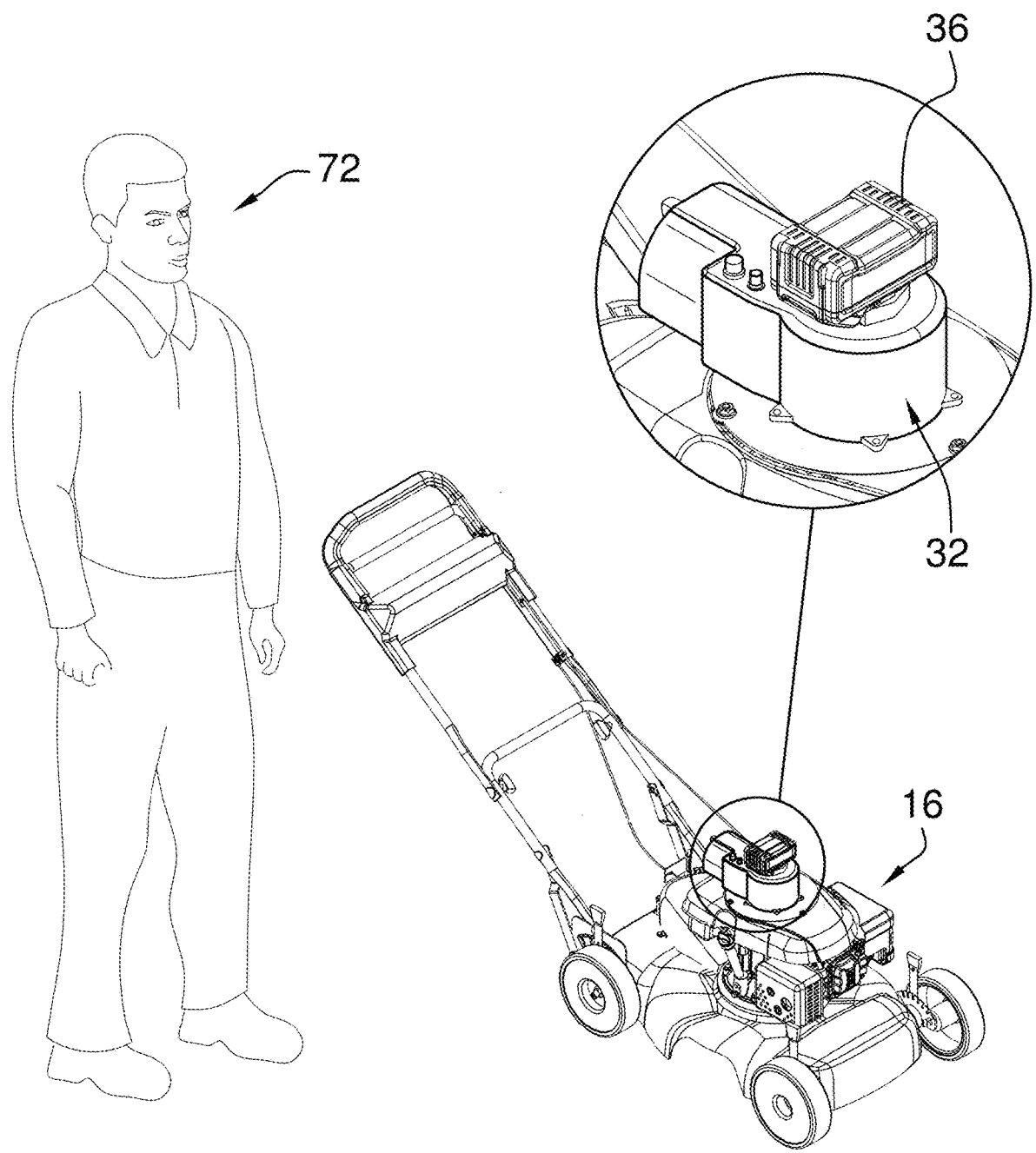
FIG. 4 is a perspective in-use view of an embodiment of the disclosure.
Figure 5:
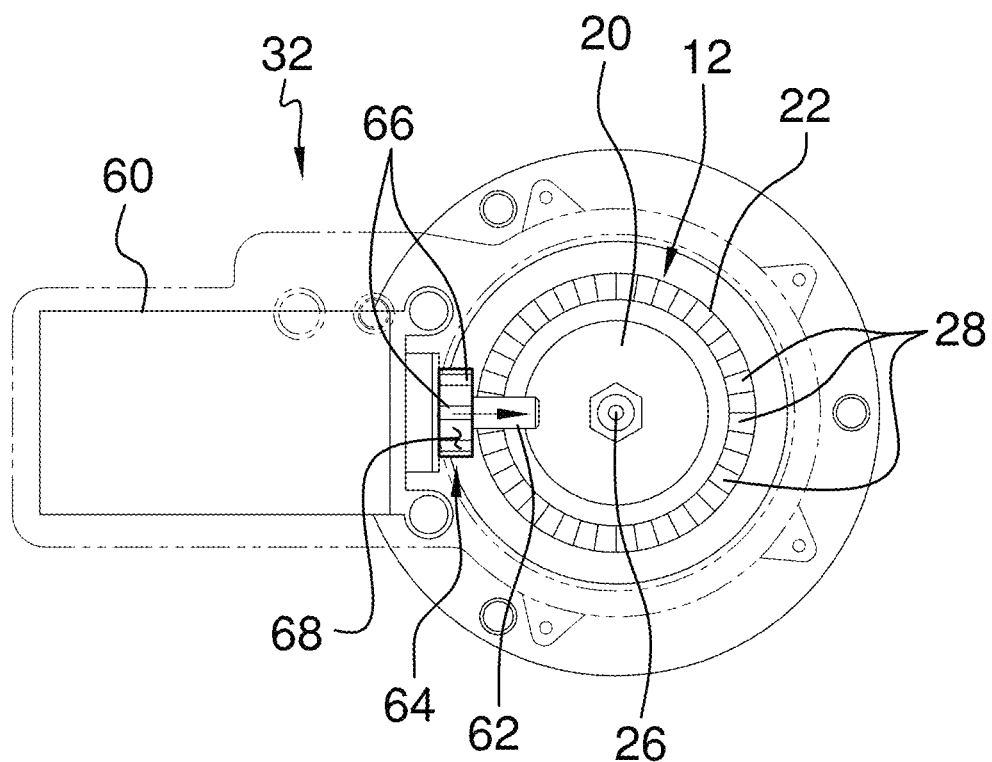
FIG. 5 is a top phantom view of a starter of an embodiment of the disclosure.
Figure 6:
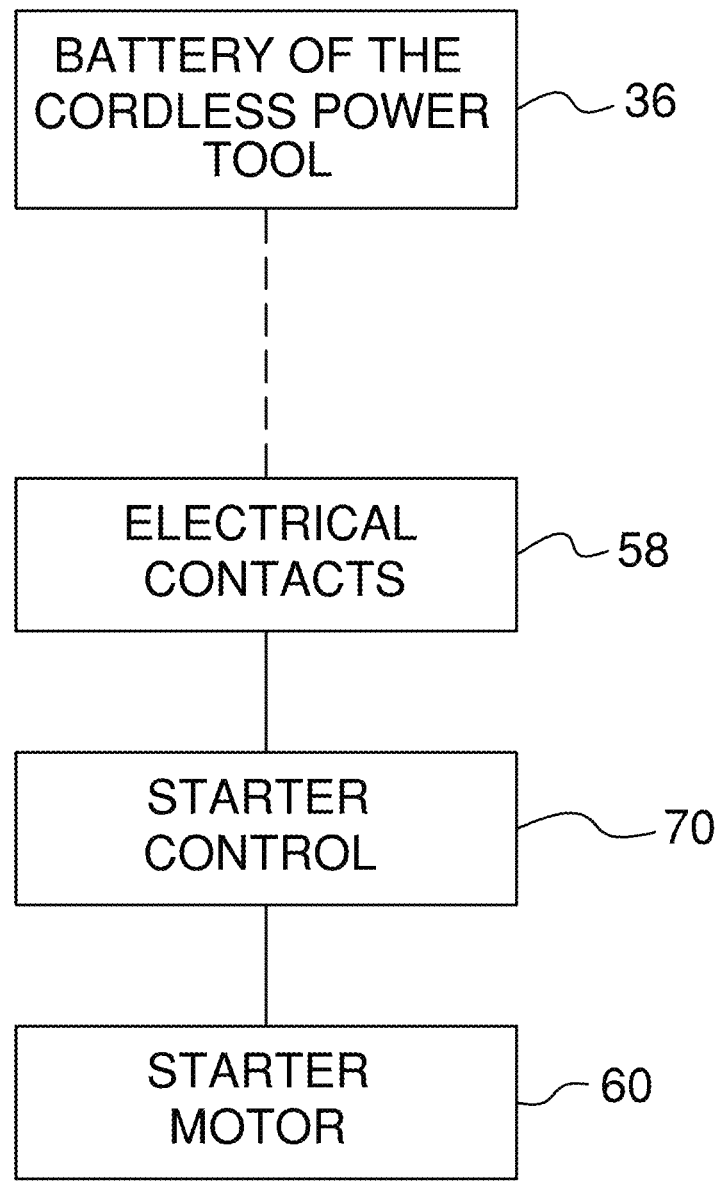
FIG. 6 is a schematic view of an embodiment of the disclosure.
Figure 7:
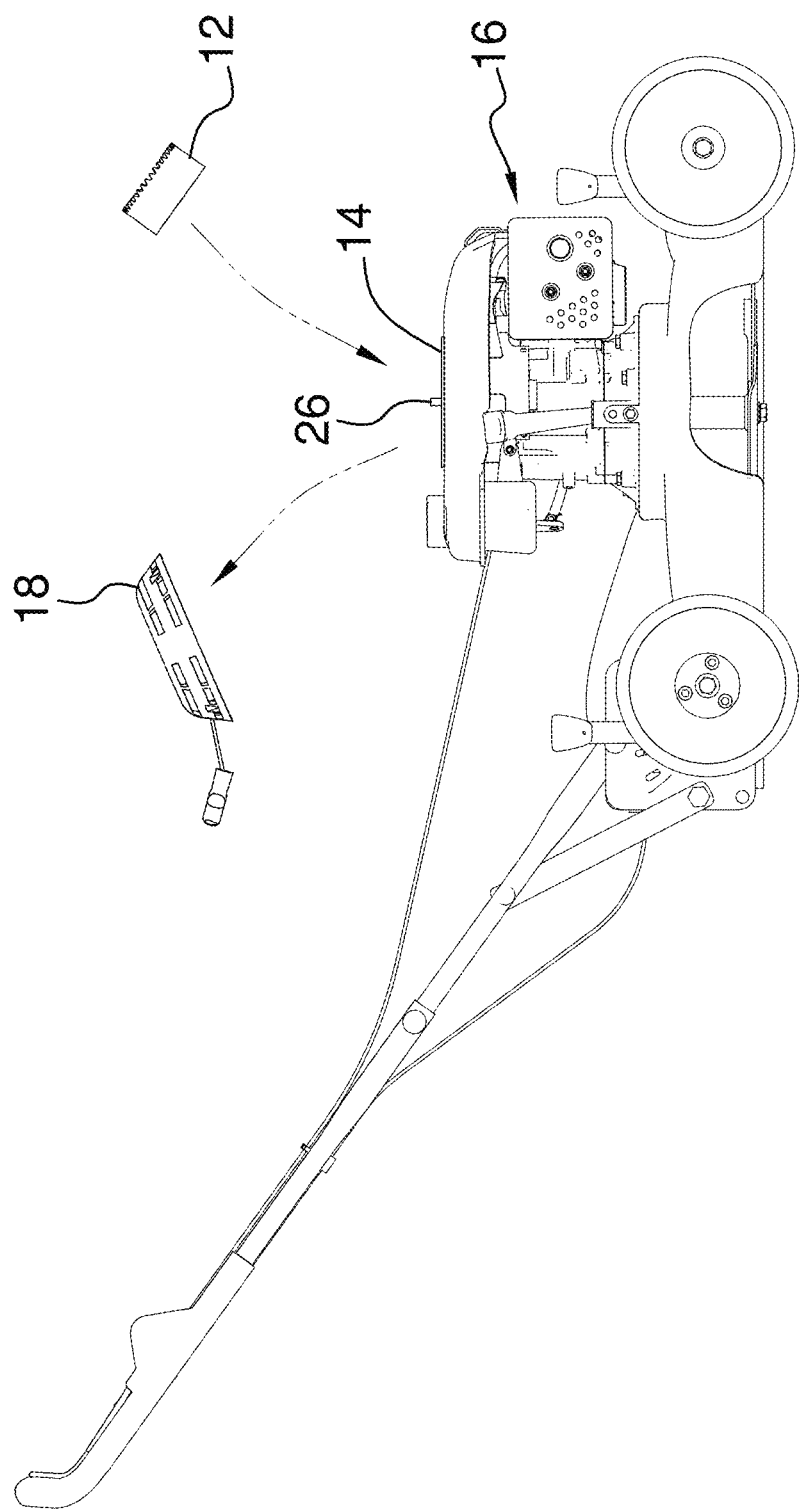
FIG. 7 is an exploded perspective view of an embodiment of the disclosure showing a pull start mechanism being removed from a small engine.

With reference now to the drawings, and in particular to FIGS. 1 through 7 thereof, a new starter device embodying the principles and concepts of an embodiment of the disclosure and generally designated by the reference numeral 10 will be described.

As best illustrated in FIGS. 1 through 7, the small engine starter device 10 generally comprises a flywheel gear 12 which is attachable to a flywheel 14 of a small engine 16 in place of a pull start mechanism 18 that has been removed from the flywheel 14. The small engine 16 may be an internal combustion engine that is mounted to a lawnmower, for example, or other type of motorized device that would normally be required to be manually started with the pull start mechanism 18. The flywheel gear 12 has a bottom wall 20 and a perimeter wall 22 extending upwardly from the bottom wall 20 and the perimeter wall 22 is continuously arcuate about a center of the bottom wall 20 such that the flywheel gear 12 has a cylindrical shape. The flywheel gear 12 has a bolt hole 24 extending through the bottom wall 20 thereby enabling the bolt hole 24 to accommodate a crank shaft 26 of the small engine 16 and the bolt hole 24 is centrally located on the bottom wall 20. The flywheel gear 12 has a plurality of teeth 28 integrated into a top edge 30 of the perimeter wall 22; the teeth 28 are evenly spaced apart from each other and are distributed around a full circumference of the top edge 30.

A starter 32 is provided and the starter 32 is mountable to the small engine 16 such that the starter 32 surrounds the flywheel gear 12. The starter 32 is actuatable into a starting condition such that the starter 32 engages the flywheel gear 12. The starter 32 rotates the flywheel gear 12 when the starter 32 is actuated into the starting condition thereby enabling the starter 32 to start the small engine 16. Furthermore, the starter 32 is normally in a disengaged condition having the starter 32 being disengaged from the flywheel gear 12 thereby enabling the flywheel 14 of the small engine 16 to freely rotate. The starter 32 has a battery socket 34 for receiving a battery of a cordless power tool 36 thereby enabling the starter 32 to be powered by the battery of the cordless power tool 36. The battery of the cordless power tool 36 may comprise a rechargeable lithium ion battery, for example, or other type of rechargeable battery that is commonly employed on cordless drills, for example, or other types of cordless power tools.

The starter 32 comprises a housing 38 that has a cylindrical portion 40 which has a top wall 42 and an outer wall 44 that is continuously arcuate about a center of the top wall 42 such that the cylindrical portion 40 has a cylindrical shape. The housing 38 has a motor portion 46 extending laterally away from the outer wall 44 of the cylindrical portion 40. The motor portion 46 has an upper wall 48 lying on a plane which is oriented coplanar with the top wall 42 of the cylindrical portion 40. Additionally, the housing 38 is positionable on the small engine 16 having the cylindrical portion 40 surrounding the flywheel gear 12. The housing 38 is comprised of a rigid material, including but not being limited to steel or aluminum, thereby enabling the housing 38 to match the structural rigidity of the small engine 16.

The housing 38 has a plurality of mounting tabs 50 each coupled to and extending laterally away from the outer wall 44 of the cylindrical portion 40. Each of the plurality of mounting tabs 50 is aligned with a bottom edge 52 of the outer wall 44 of the cylindrical portion 40. Additionally, the plurality of mounting tabs 50 is evenly spaced apart from each other and is distributed around the outer wall 44 of the cylindrical portion 40. Each of the plurality of mounting tabs 50 has a fastener hole 54 for insertably receiving a respective one of a plurality of fasteners 56 which each engages the small engine 16 for securing the housing 38 to the small engine 16 and the battery socket 34 is positioned on the top wall 42 of the cylindrical portion 40. Furthermore, the battery socket 34 has a plurality of electrical contacts 58 which is each in electrical communication with the battery of the cordless power tool 36 when the battery of the cordless power tool 36 is inserted into the battery socket 34. Each of the plurality of fasteners 56 which are extended through the plurality of mounting tabs 50 may comprise a screw or bolt or other type of threaded fastener.

The starter 32 includes a starter motor 60 which is positioned within the motor portion 46 of the housing 38 and the starter motor 60 has an output shaft 62 which extends into the cylindrical portion 40 of the housing 38. The starter motor 60 rotates the output shaft 62 in a first direction about a rotational axis which is perpendicularly oriented with a rotational axis of the flywheel gear 12 when the starter motor 60 is actuated. Additionally, the starter motor 60 may comprise an electric motor and the starter motor 60 includes a starter motor Bendix that is commonly associated with starters for internal combustion engines.

The starter motor 60 includes a starter gear 64 which is positioned around the output shaft 62 of the starter motor 60 thereby enabling the starter gear 64 to be rotated when the starter motor 60 is actuated. The starter gear 64 has a plurality of teeth 66 integrated into an outer surface 68 of the starter gear 64. Furthermore, the plurality of teeth 66 in the outer surface 68 of the starter gear 64 enmeshes with the plurality of teeth 28 in the top edge 30 of the perimeter wall 22 of the flywheel gear 12 when the starter motor 60 is actuated. In this way the starter motor 60 is enabled to rotate the flywheel gear 12 to start the small engine 16. Additionally, the starter gear 64 is displaced from the flywheel gear 12 when the starter motor 60 is de-actuated via the starter motor Bendix.

The starter 32 includes a starter control 70 which is movably integrated into the upper wall 48 of the motor portion 46 of the housing 38 thereby enabling the starter control 70 to be manipulated. The starter control 70 is electrically coupled between the battery socket 34 and the starter motor 60 thereby placing the starter motor 60 in electrical communication with the battery socket 34. Additionally, the starter motor 60 is actuated when the starter control 70 is manipulated into a starting position thereby enabling a user 72 to start the small engine 16. In this way the user 72 can start the small engine 16 without being required to employ the pull start mechanism 18 that would typically be required to start the small engine 16. The starter control 70 may include a power button 74 which places the battery socket 34 in electrical communication with the starter motor 60 and a starter actuator button 76 that actuates the starter motor 60.

In use, the pull start mechanism 18 is removed from the small engine 16 and the flywheel gear 12 is mounted to the crank shaft 26 of the small engine 16. Additionally, the housing 38 of the starter 32 is mounted to the small engine 16 in place of the pull start mechanism 18. The battery of the cordless power tool 36 is inserted into the battery socket 34 and the starter control 70 is manipulated to actuate the starter motor 60. In this way the starter motor 60 starts the small engine 16 in lieu of the pull start mechanism 18. Thus, the user 72 can start the small engine 16 with minimal effort as compared to starting the small engine 16 with the pull start mechanism 18. The battery of the cordless power tool 36 is removed from the battery socket 34 and is placed into a battery charger for recharging the battery of the cordless power tool 36 when the battery of the cordless power tool 36 becomes depleted.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A small engine starter device for automatically starting a small engine with a pull start mechanism, said device comprising:
   a flywheel gear being attachable to a flywheel of a small engine in place of a pull start mechanism that has been removed from said flywheel; and
   a starter being mountable to said small engine such that said starter surrounds said flywheel gear, said starter being actuatable into a starting condition such that said starter engages said flywheel gear, said starter rotating said flywheel gear when said starter is actuated into said starting condition thereby enabling said starter to start said small engine, said starter being normally in a disengaged condition having said starter being disengaged from said flywheel gear thereby enabling said flywheel of said small engine to freely rotate, said starter having a battery socket for receiving a battery of a cordless power tool thereby enabling said starter to be powered by said battery of the cordless power tool.

2. The device according to claim 1, wherein:
   said flywheel gear has a bottom wall and a perimeter wall extending upwardly from said bottom wall;
   said perimeter wall is continuously arcuate about a center of said bottom wall such that said flywheel gear has a cylindrical shape;
   said flywheel gear has a bolt hole extending through said bottom wall thereby enabling said bolt hole to accommodate a crank shaft of said small engine;
   said bolt hole is centrally located on said bottom wall;
   said flywheel gear has a plurality of teeth being integrated into a top edge of said perimeter wall; and
   said plurality of teeth is evenly spaced apart from each other and is distributed around a full circumference of said top edge.

3. The device according to claim 1, wherein:
   said starter includes a housing having a cylindrical portion which has a top wall and an outer wall being continuously arcuate about a center of said top wall such that said cylindrical portion has a cylindrical shape;
   said housing has a motor portion extending laterally away from said outer wall of said cylindrical portion;
   said motor portion has an upper wall lying on a plane being oriented coplanar with said top wall of said cylindrical portion;
   said housing is positionable on said small engine having said cylindrical portion surrounding said flywheel gear;
   said housing has a plurality of mounting tabs each being coupled to and extending laterally away from said outer wall of said cylindrical portion;
   each of said plurality of mounting tabs is aligned with a bottom edge of said outer wall of said cylindrical portion;
   said plurality of mounting tabs is evenly spaced apart from each other and is distributed around said outer wall of said cylindrical portion;
   each of said plurality of mounting tabs has a fastener hole for insertably receiving a respective one of a plurality of fasteners which each engages said small engine for securing said housing to said small engine;
   said battery socket is positioned on said top wall of said cylindrical portion; and
   said battery socket has a plurality of electrical contacts each being in electrical communication with said battery of the cordless power tool when said battery of the cordless power tool is inserted into said battery socket.

4. The device according to claim 3, wherein:
   said starter includes a starter motor being positioned within said motor portion of said housing;
   said starter motor has an output shaft which extends into said cylindrical portion of said housing; and
   said starter motor rotates said output shaft in a first direction about a rotational axis being perpendicularly oriented with a rotational axis of said flywheel gear when said starter motor is actuated.

5. The device according to claim 4, wherein:
   said flywheel gear has a perimeter wall which has a top edge;
   said flywheel gear has a plurality of teeth being integrated into said top edge of said perimeter wall;
   said starter includes a starter gear being positioned around said output shaft of said starter motor thereby enabling said starter gear to be rotated when said starter motor is actuated;
   said starter gear has a plurality of teeth being integrated into an outer surface of said starter gear; and
   said plurality of teeth in said outer surface of said starter gear enmeshes with said plurality of teeth in said top edge of said perimeter wall of said flywheel gear when said starter motor is actuated thereby enabling said starter motor to rotate said flywheel gear to start said small engine.

6. The device according to claim 4, wherein:
   said starter includes a starter control being movably integrated into said upper wall of said motor portion of said housing thereby enabling said starter control to be manipulated;
   said starter control is electrically coupled between said battery socket and said starter motor thereby placing said starter motor in electrical communication with said battery socket; and
   said starter motor is actuated when said starter control is manipulated into a starting position wherein said starter control is configured to enable a user to start said small engine.

7. A small engine starter device for automatically starting a small engine with a pull start mechanism, said device comprising:
   a flywheel gear being attachable to a flywheel of a small engine in place of a pull start mechanism that has been removed from said flywheel, said flywheel gear having a bottom wall and a perimeter wall extending upwardly from said bottom wall, said perimeter wall being continuously arcuate about a center of said bottom wall such that said flywheel gear has a cylindrical shape, said flywheel gear having a bolt hole extending through said bottom wall thereby enabling said bolt hole to accommodate a crank shaft of said small engine, said bolt hole being centrally located on said bottom wall, said flywheel gear having a plurality of teeth being integrated into a top edge of said perimeter wall, said plurality of teeth being evenly spaced apart from each other and being distributed around a full circumference of said top edge; and a starter being mountable to said small engine such that said starter surrounds said flywheel gear, said starter being actuatable into a starting condition such that said starter engages said flywheel gear, said starter rotating said flywheel gear when said starter is actuated into said starting condition thereby enabling said starter to start said small engine, said starter being normally in a disengaged condition having said starter being disengaged from said flywheel gear thereby enabling said flywheel of said small engine to freely rotate, said starter having a battery socket for receiving a battery of a cordless power tool thereby enabling said starter to be powered by said battery of the cordless power tool, said starter comprising:

a housing having a cylindrical portion which has a top wall and an outer wall being continuously arcuate about a center of said top wall such that said cylindrical portion has a cylindrical shape, said housing having a motor portion extending laterally away from said outer wall of said cylindrical portion, said motor portion having an upper wall lying on a plane being oriented coplanar with said top wall of said cylindrical portion, said housing being positionable on said small engine having said cylindrical portion surrounding said flywheel gear, said housing having a plurality of mounting tabs each being coupled to and extending laterally away from said outer wall of said cylindrical portion, each of said plurality of mounting tabs being aligned with a bottom edge of said outer wall of said cylindrical portion, said plurality of mounting tabs being evenly spaced apart from each other and being distributed around said outer wall of said cylindrical portion, each of said plurality of mounting tabs having a fastener hole for insertably receiving a respective one of a plurality of fasteners which each engages said small engine for securing said housing to said small engine, said battery socket being positioned on said top wall of said cylindrical portion, said battery socket having a plurality of electrical contacts each being in electrical communication with said battery of the cordless power tool when said battery of the cordless power tool is inserted into said battery socket;

a starter motor being positioned within said motor portion of said housing, said starter motor having an output shaft which extends into said cylindrical portion of said housing, said starter motor rotating said output shaft in a first direction about a rotational axis being perpendicularly oriented with a rotational axis of said flywheel gear when said starter motor is actuated;

a starter gear being positioned around said output shaft of said starter motor thereby enabling said starter gear to be rotated when said starter motor is actuated, said starter gear having a plurality of teeth being integrated into an outer surface of said starter gear, said plurality of teeth in said outer surface of said starter gear enmeshing with said plurality of teeth in said top edge of said perimeter wall of said flywheel gear when said starter motor is actuated thereby enabling said starter motor to rotate said flywheel gear to start said small engine; and a starter control being movably integrated into said upper wall of said motor portion of said housing thereby enabling said starter control to be manipulated, said starter control being electrically coupled between said battery socket and said starter motor thereby placing said starter motor in electrical communication with said battery socket, said starter motor being actuated when said starter control is manipulated into a starting position wherein said starter control is configured to enable a user to start said small engine.

\* \* \* \* \*